June 15, 1965 J. RABINOW 3,189,873

SCANNING PATTERN NORMALIZER

Filed Aug. 9, 1962 5 Sheets-Sheet 1

INVENTOR

Jacob Rabinow

BY Joseph A. Genovese & Max L. Libman

ATTORNEYS

INVENTOR
Jacob Rabinow

BY Joseph A. Genovese & Max L. Libman

ATTORNEYS

INVENTOR
Jacob Rabinow

BY Joseph A. Genovese &
Max L. Libman

ATTORNEYS

June 15, 1965 J. RABINOW 3,189,873

SCANNING PATTERN NORMALIZER

Filed Aug. 9, 1962 5 Sheets-Sheet 4

INVENTOR
Jacob Rabinow

BY Joseph A. Genovese & Max L. Libman

ATTORNEYS

INVENTOR
Jacob Rabinow
BY Joseph A. Genovese & Max L. Libman
ATTORNEYS

United States Patent Office
3,189,873
Patented June 15, 1965

3,189,873

SCANNING PATTERN NORMALIZER

Jacob Rabinow, Takoma Park, Md., assignor, by mesne assignments, to Control Data Corporation, Minneapolis, Minn., a corporation of Minnesota Filed Aug. 9, 1962, Ser. No. 215,878
7 Claims. (Cl. 340—146.3)

This invention relates to scanning systems for reading machines, and particularly to scanning systems to overcome problems of character-size differences.

There are several methods of identifying characters by machine. Some are more sensitive to character-size differences than others. For example, comparison machines (where the image of an unknown character is compared to optical or electrical masks) ordinarily tolerate less character-size variation than curve tracing machines. But even in curve tracing machines, character identification is simplified if character-size is known beforehand. For instance, seen Patent No. 2,838,602 where the character is "framed" before polar scanning.

Certain other reading machines have been designed to be independent of character-size variations, for example, as disclosed in Patents Nos. 2,919,426 and 2,932,006. To achieve this, the machines themselves are specially designed, usually at the expense of recognition-speed.

It is possible to design machines for special fonts where there is stringent control of character-size. This imposes serious limitations on the user, and I believe that the art would be advanced by providing a scanning system which allows character-size variations, but which enables the logic circuits of the reading machine to function as though the characters were all of the same or nearly the same size (normalized). To this end, my application Serial No. 188,736, entitled Normalizing Reading Machine discloses an optical system which normalizes the size of the image projected onto the scanner. This is preferably satisfactory for reading rates of the order of 400 characters per second with minimal optical devices. However, optical complexity is introduced when characters are read faster and/or when they are intermixed, i.e., some tall and short, and wide or narrow.

My present invention deals with normalizing the scan system itself to suit the character rather than normalizing the character image. I do this without specially designing the machine to be independent of character-size, and without limitation on the kind of machine (comparison, curve tracing, stroke analysis, etc.) with which my invention is used.

The essence of my invention is to measure the width of an unknown character (usually its image) and also meassure its height, and adjust the scan pattern to conform to the measurements. As will be seen later, the measurements can be made on a character-by-character, group, line, or other basis.

Of all reading machine techniques, probably the comparison machine is somewhat more sensitive to size variations than the others. If the unknown character is larger or smaller than the mask (consider electronic masks for example as in Patent No. 3,104,369) the machine will generally reject the character. Accordingly, I have elected to describe embodiments of my invention which examine each character line-by-line (i.e., scan traces) with many sample points along each line (trace). The effect is to cover the character area with a grid of examination points to extract data from the character, suitable for comparison machine logic circuits—without the logic circuits ever "knowing" that the character image was small or large. For this reason my invention is suited for any kind of logic (curve tracing, analysis, etc.).

The principle of my inventions is discussed in terms of embodiments having an apertured scanning disc which rotates at constant speed and examines a horizontally moving character. Thus, a narrow character moving horizontally at a uniform rate will be vertically traversed by a small number of scan holes in comparison to the number of traversals of a wide character. Therefore, by a preexamination of the character width, I can determine how much to accelerate or decelerate an unknown character so that it will be traversed a fixed, predetermined number of times by scan holes as it passes across the examination area of the scanning disc. Character height variations affect the number of samples required in each vertical traverse of the image (by a hole in the disc) in order that the necessary sampling uniformity may be preserved. In other words, a character image one inch tall must be sampled during each scan trace twice as fast as a character two inches tall in order that both characters will be sampled an equal number of times. Therefore, I measure the height of the unknown character and adjust the sampling timing frequency in accordance with the size of the character.

As a result of the above procedures I generate a condition which may be thought of as a raster or grid encompassing the character image area, where the raster is proportionately enlarged or reduced to suit the character's image size. Regardless of the overall area of the raster, it will always contain the same number of vertical scan traces and horizontal sampling points along each trace.

Accordingly, an object of my invention is to provide a normalizing scan system which is responsive to the size of unknown characters to examine all characters uniformly, that is, with the same number of vertical scans and the same number of sampling points in each scan.

Another object of my invention is to provide a scanning system where either the height detection or width detection feature may be used to the exclusion of the other in instances where only one or the other character-size variation is expected, or will affect the reading machine.

Another object of my invention is to provide a scanning system where the scan pattern is normalized to suit the character size, and where I have a considerably simplified method of gating the width and/or height detector in synchronism with the rotation of a scanning disc. This objective entails one of the scan apertures used as a part of a gate system for the height, width, and/or read procedures.

Another object of my invention is to provide a size-normalizing scan system which responds to character size to provide uniform coverage i.e., the same resolution of examination, of a character regardless of its size; and with the feature of being independent of the type of basic machine with which it is used. Thus, the benefits of my normalized scanning system can be applied to most machines, such as curve tracing, analysis, comparison, etc.

Other objects and features of importance will become apparent in following the description of the illustrated forms of the invention which are given by way of example and explanation only.

FIGURE 1 is a diagrammatic view of a large character showing six vertical traces thereon, each representing the path of a scan hole over the character.

FIGURE 1*a* is a view showing another character with the same number of traces but normalized to fits the character width.

FIGURE 1*b* is a purely explanatory view showing the procedure for normalizing the horizontal spacing between the vertical traces of FIGURES 1 and 1*a*.

FIGURE 2 shows a comparatively large character with six vertical traces, each having ten uniformly spaced sample points.

FIGURE 2*a* shows a smaller character and particularly how the number of sample points remain the same; but they are moved closer together to suit the vertical height of the smaller character.

FIGURE 2*b* is a purely diagrammatic view showing the method of achieving the results in FIGURES 2 and 2*a*.

FIGURE 3 shows a small character while FIGURE 3*a* shows a larger character, both of these characters being sampled an equal number of times by means of a sample grid which is opened for the large character. These views show what is achieved by my present invention.

FIGURE 3*b* is a diagrammatic view showing how the features of FIGURES 1*b* and 2*b* are combined to yield the results of FIGURES 3 and 3*a*.

Figure 6:
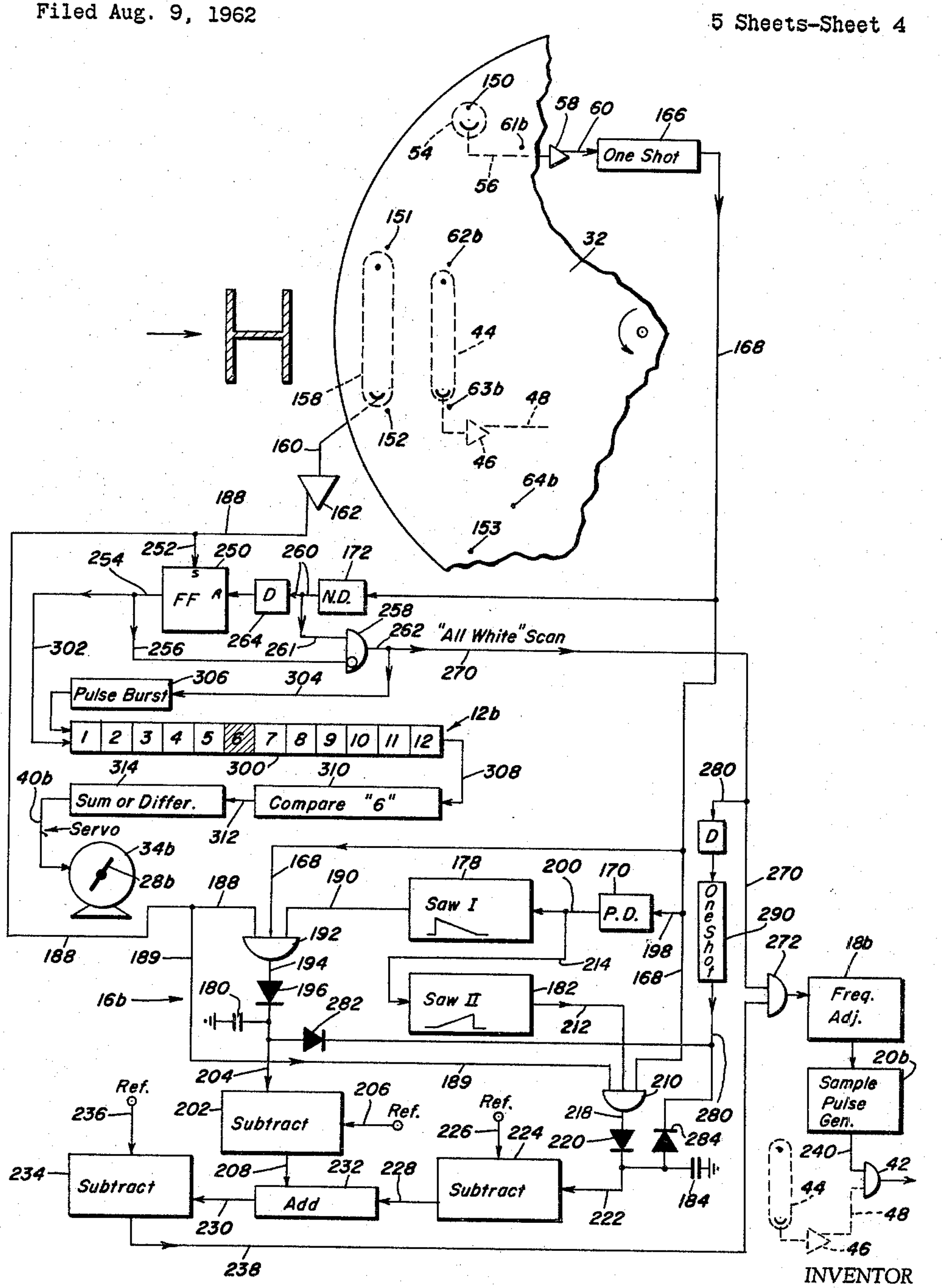
FIGURE 6 is a view showing another form of my invention where the pre-examination and examination take place with only one scanning disc and further showing digital circuits (width detector) and analog circuits (height detector) as being interchangeable techniques.
Figure 6A:
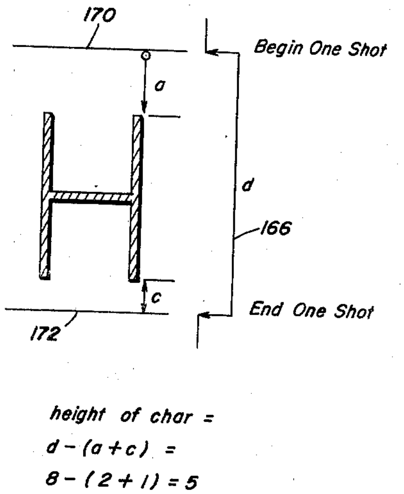

FIGURE 6*a* is a schematic view to help explain operation of the height detector at the lower part of FIGURE 6.

Figure 6B:
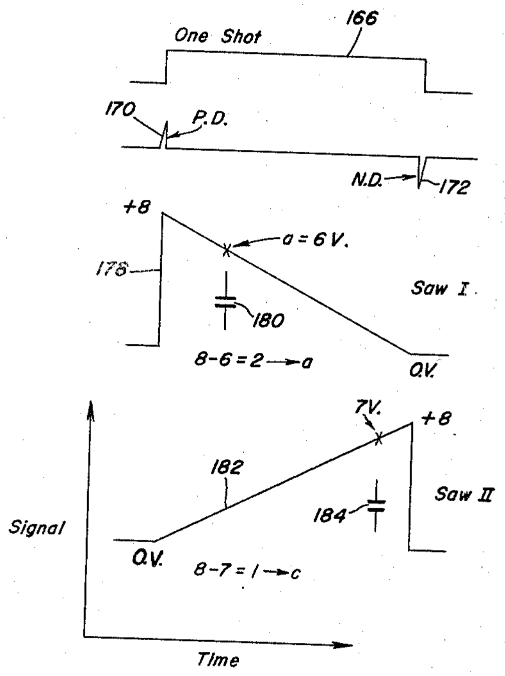

FIGURE 6*b* shows a group of curves used as a further aid in the understanding of the height detector of FIGURE 6.

Figure 6C:
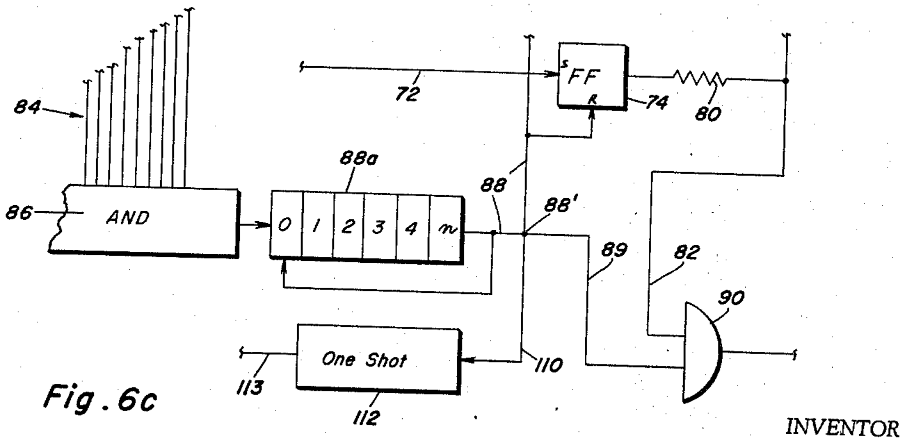

FIGURE 6*c* is a fragmentary view showing a modification.

*Preface*

FIGURES 1–3*b* show how my invention solves the rather difficult problem encountered by optical reading machines in recognizing characters of different sizes.

Figure 1:
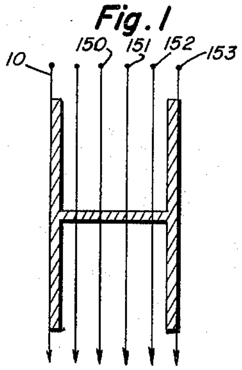
Figure 1A:
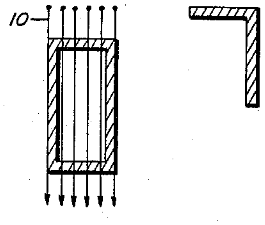
Figure 1B:
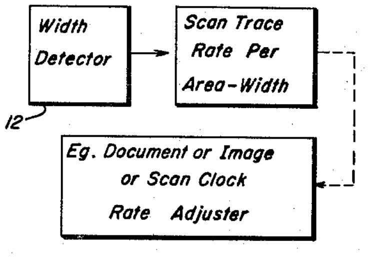

In FIGURE 1, I show six vertical traces 10, as would be made by successive scan holes (elements) approximately vertically traversing a horizontally moving image of an unknown character. FIGURE 1*a* shows a narrower character with the same number of traces 10 but they are so spaced that they cover the entire character area just as is the spacing of the traces in FIGURE 1 to cover the character shown therein. Although six scan lines (traces) may be sufficient in the recognition of some characters, it is understood that the number of scan lines may be increased or decreased, usually the former to increase resolution. I show only six lines for clarity. The horizontal space adjustment of the lines 10 is accomplished as shown in FIGURE 1*b*. Width detector 12 examines the width of the character and either accelerates or decelerates the horizontal image motion accordingly. This can be accomplished in many ways, and some will be described later.

In certain machines it is possible to use information derived from the scan lines themselves. In others, it is necessary or desirable to load a temporary storage with information extracted from the character on a sample-point basis. In other words, during each scan trace, information is extracted at spaced points along the scan trace. I have diagrammatically shown the sampling points 14 as small dashes on the traces 10 in FIGURES 2, 2*a*, 3, 3*a*. For a tall character, sample points must be spaced farther apart than for a short character so that every character is sampled an equal number of times regardless of its height. To do this, I use height detector 16 (FIG. 2*b*) to measure the height of the unknown character and provide a signal to operate frequency adjuster 18 which controls the sample timing signal generator 20. This will be described later in detail.

Figures 3, 3A, 3B:
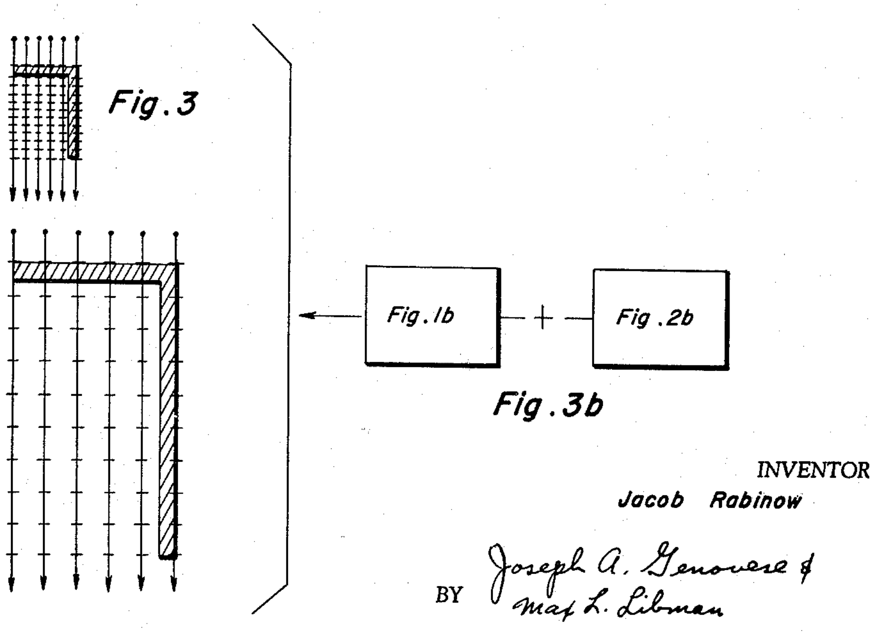

FIGURE 3*b* shows how the above features are combined to produce the results illustrated in FIGURES 3 and 3*a* for comparatively small and large characters.

Figure 4:
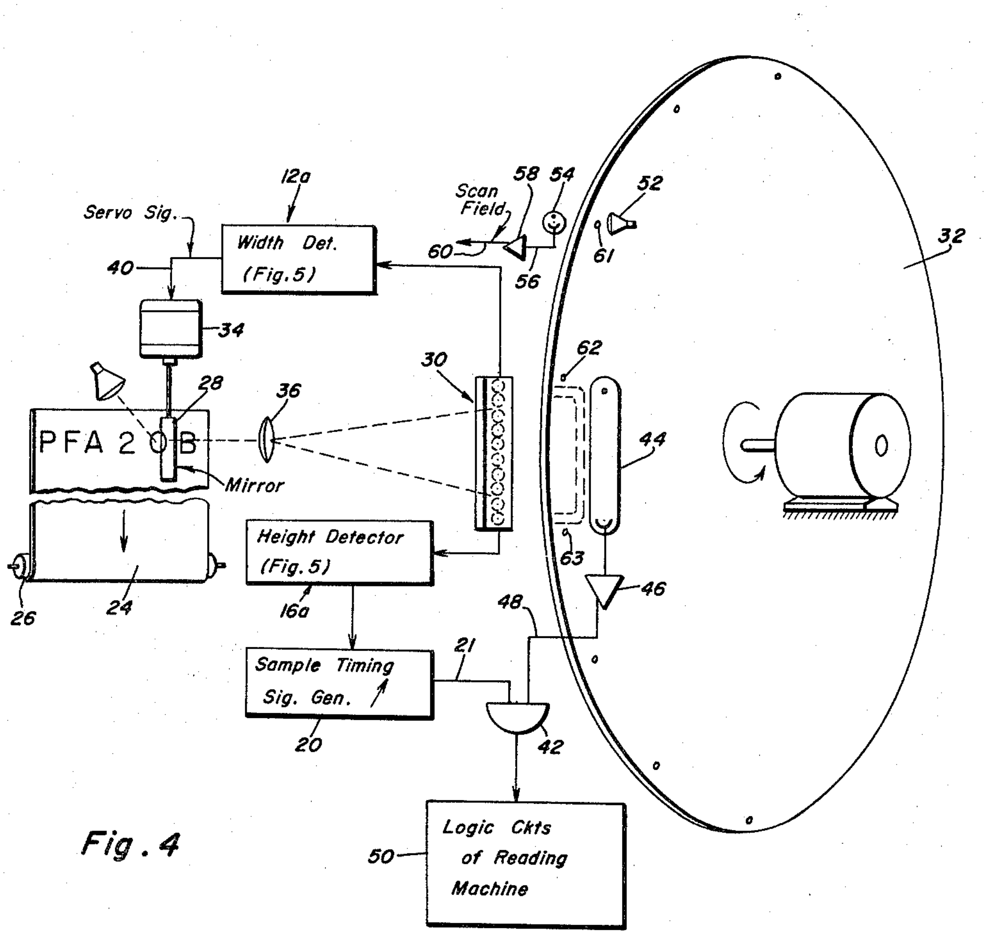
FIGURE 4 is a diagrammatic view showing pertinent parts of one kind of reading machine equipped with the features of my invention.
Figure 5:
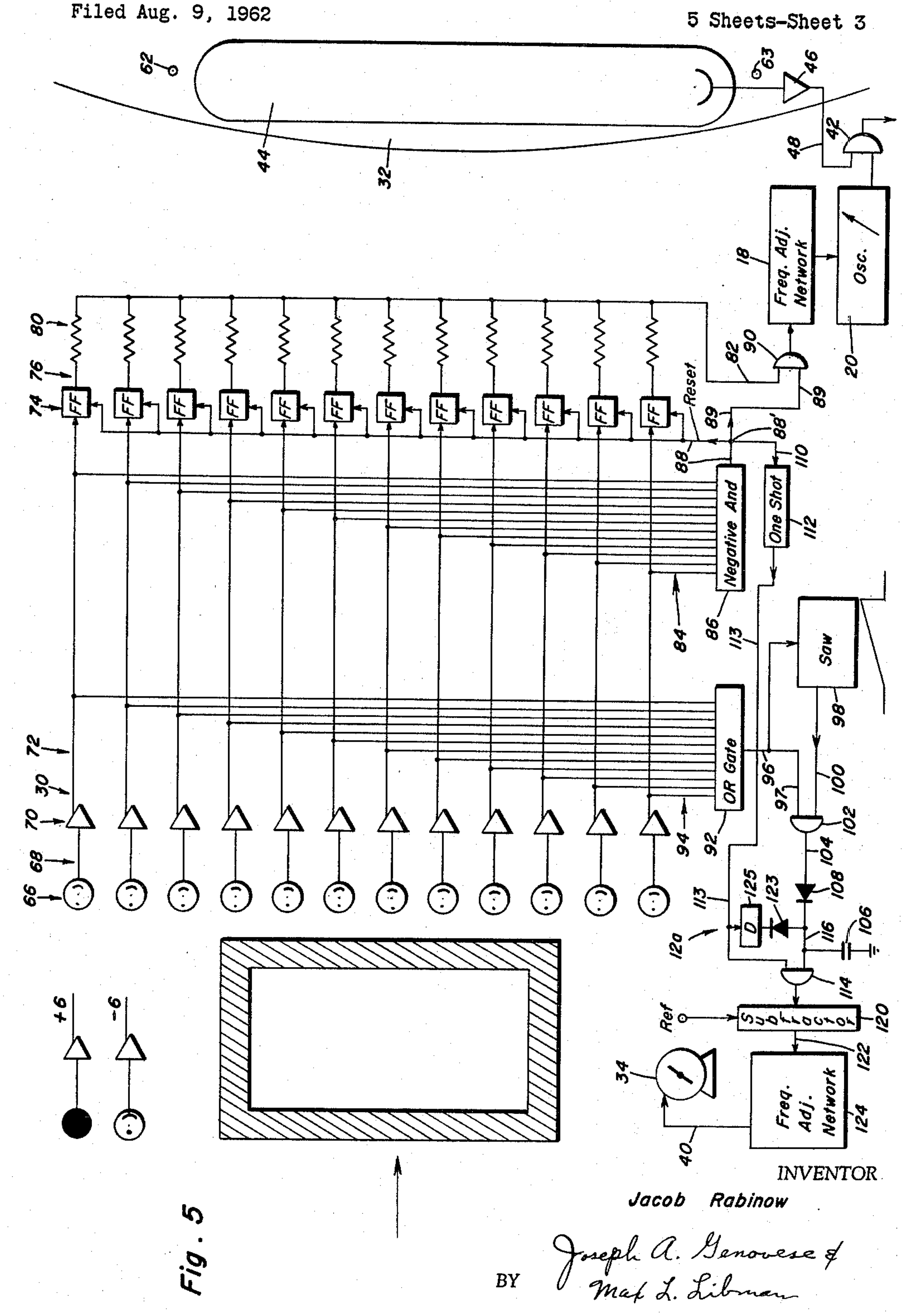
FIGURE 5 shows the normalizing scan system control circuitry in one of its forms, used as a pre-examination device apart from the scanning disc.

*Embodiments of FIGURES 4 and 5*

FIGURE 4 shows one possible configuration of a scan system having the normalizing features of my invention. I show a document 24 having characters on its surface, and moved by a conventional paper mover 26. As the document moves down, the rotating mirror 28, prism or the like, reflects an image of a line of characters onto a pre-examination device 30 located in advance of (with respect to character-image motion) a conventional scanning disc 32. The mirror 28 is operated by a motor 34 and may be of any configuration, for instance as shown in the Rabinow et al. Patent No. 3,142,224 entitled Reflective Scanner. Obviously, an oscillating mirror or the equivalent can be substituted. Further, an optical system or systems, represented by lens 36 would ordinarily be used to form an image of each character of the line first on the face of the pre-examination device 30 and then on scanning disc 32.

Pre-examination device 30 provides information for width detector 12*a* to develop a servo correction signal on line 40 for motor 34. The servo correction signal either accelerates or decelerates mirror 28 to change the horizontal speed of the images of characters traversing the pre-examination device and scanning disc 32.

Figure 2:
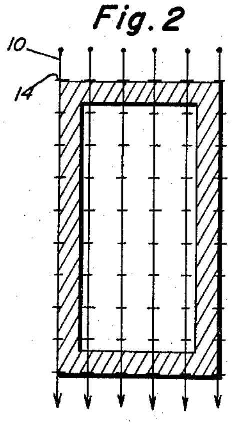
Figure 2A:
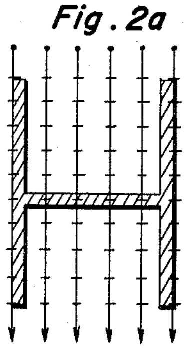
Figure 2B:
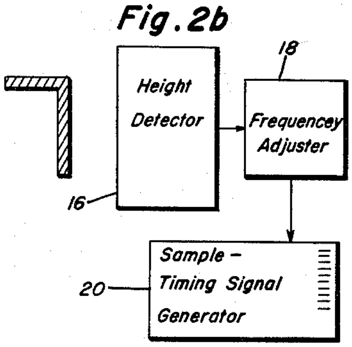

Device 30 also provides information for the height detector 16*a* to measure the height of the character image and provide a signal to adjust the sample timing signal generator 20. The sample timing signals conducted on line 21, are gated at 42 with information output signals form a photocell 44 which is used with scanning discs 32. The photocell 44 has amplifier 46 whose output line 48 forms one input of gate 42 while line 21 is its other input. The gate 42 shows how the sample timing signals are gated with the information outputs extracted from the character so that each scan line 10 is modulated with "black" or "white" signals extracted from the character at the previously mentioned points 14 (FIGURE 2, for example). The output of gate 42 is applied to the logic circuits 50 of the reading machine. The specific nature of circuits 50 form no part of my present invention, and they may be considered as conventional.

Near the top of disc 32 I have a light source 52 and photocell 54 on opposite sides of the disc. The output line 56 of photocell 54 has an amplifier 58 to conduct signals on line 60 each time that a scan hole 61, 62, 63, etc., passes between the photocell and light source 52. The signal on lines 60 is used to commence the scan field, i.e., the beginning of the vertical traces 10 during which information is extracted from the character. Since this feature is not intimately connected with the form of the invention shown in FIGURES 4 and 5, specific discussion thereof is deferred until FIGURE 6 is described, the latter embodiment showing in detail how this feature is used.

Attention is now directed to FIGURE 5 which shows one way of constructing the width detector 12*a*, the height detector 16*a* and the photo sensitive pre-examination device 30. Device 30 is composed of a vertical row of photocells 66, for example, silicon diodes or other photosensitive cells. Although cells 66 are shown widely spaced, in practice they will be close together and there will be more of them. Each cell has its output on a line 68 which is amplified at 70, for example by a quantizing amplifier 70, and the output lines 72 of the amplifiers actuate a bank of memory devices 74, e.g., flip flops. The sketch at the upper left corner of FIGURE 5 shows one method of quantizing where the output signal on a line 72 is +6 volts when the photocell "sees black" (a portion of the character image), and the signal is −6 volts when the photocell "sees white" (a part of the character background). Each flip flop 74 responds only to positive signals and provides an output signal on its output line 76 when it is set (actuated). The necessity for the flip flops 74 is occasioned by one of the features of my invention, which is to examine an entire character, group of characters, line, etc., before making a decision as to the height of the character.

First, consider height measurements on the character-for-character basis. As the character "O" (shown to the left of FIGURE 5) sweeps horizontally across the photocells 66, the top three and the bottom two photocells will see only "white" (the character background), and all other photocells will at one time or another see "black" (part of the character mentioned). Thus, the corresponding top three and bottom two flip flops will provide no outputs on their lines 76 and all other flip flops will provide outputs on their lines which are summarized by the resistive adder 80. Thus, there will be an output signal available on line 82 of the adder, which is proportional to the height of the character. This signal is used to adjust the sample timing generator 20, for instance, by operating frequency adjusting network 18.

When the illustrated character "O" (FIGURE 5) has moved past the field of view of the photocells 66, the photocells will see the clear white space between the adjacent characters to that the signals on all lines 72 will go to −6 volts. Lines 84 are connected to lines 72, and they are gated by a negative And gate 86 which is responsive only to negative signals. When there is coincidence at gate 86, there is an output signal on line 88 representing "end of character." This signal resets all the flip flops 74, and is conducted on line 89 to analog And gate 90 which has the frequency adjusting (height measurement) signal on line 82 as its other input. Thus, the height measurement signal on line 82 is gated into the frequency adjusting network 18 when the character has just passed the vertical row of photocells 66. Had I desired to use a sample of more than one character for the height measurement, I could interpose a shift register (FIG. 6*c*) **88*a* in the flip flops reset line 88 between gate 86 and the juncture 88′. The shift register 88*a*** has a number of stages "*n*" corresponding to the number of characters that I decide to count as a sample (this could be an entire line). Thus, the flip flops would not be reset, nor gate 90 actuated until the desired number of characters had been measured. Obviously, other signals to accomplish the same result may be used. In place of register **88*a*, a signal derived from the shaft of motor 34 (FIGURE 4) each time that the mirror 28 turns through a predetermined arc, could be used as an input to gate 90 and also to reset flip flops 74**.

Earlier I mentioned coincidence And gate 42 (FIGURES 4 and 5). This gate passes information derived from the character when its image is projected on the information extracting disc 32 (FIGURE 4). At the time the image reaches the face of disc 32, the height detecting network will have functioned and the oscillator 20 adjusted so that gate 42 will be pulsed at the correct frequency to yield the correct number of sampling points 14 for the size of character (FIGURES 3*a* or 3, for example). The information extracted from the image is developed at photocell 44 and its amplifier 46 whose output line 48 forms the other input of gate 42.

At the lower left corner of FIGURE 5 I have shown width detector **12*a* designed to measure the width of an unknown character, which can be made to function on a character-for-character, sample-for-sample, line-for-line, etc., basis. Considering first the single-character situation, I Or gate (at 92) the signals on all lines 72 by way of interconnecting lines 94. Thus, at the time that a positive signal first occurs on any of the lines 72, the Or gate provides an output on line 96 which starts a sawtooth generator 98 whose signal is conducted on line 100 to And gate 102. As long as the gate 92 continues to conduct, the signal on lines 96, 97 is impressed on gate 102 together with the sawtooth signal. Thus, the output line 104 of gate 102 charges storage capacitor 106 through a diode 108. When the gate 92 stops conducting (the character image has passed the photocells 66 and the clear white space between the characters is detected) gate 102 stops conducting and capacitor 106 charges no higher. Now, returning to the output of the negative And gate 86 which will fire at this time (because of the clear white space between characters), its signal on line 88 is conducted over line 110 to a one-shot multi-vibrator 112 to first interrogate, and then discharge capacitor 106. Interrogation takes place at And gate 114 whose only other input is on line 116 to which capacitor 66 is connected. The output signal from gate 114 is connected to a conventional subtractor 120 which subtracts the signal derived from the charge on capacitor 106 from a reference voltage and provides the difference on line 122 which is impressed on frequency adjusting network 124, or the like, to provide the previously mentioned servo signal on line 40 to the motor 34. Very shortly after gate 114 is satisfied, the output signal from the one shot multi-vibrator 112 on line 113 is conducted through a diode 123 in delay line 125 to restore the capacitor 106 to a predetermined level. Again, if we wish to use a sample composed of more than one character for adjusting the rate at which the charcter images are horizontally swept across the reading area of disc 34, we would use a signal derived from the shaft of motor 34**, as discussed before.

*Embodiments of FIGURES 6–6b*

FIGURE 6 shows scanning disc **32*b* with two sets of holes 61*b*, 62*b, 63*b*, 64*b*, etc., and holes 150, 151, 152, etc. The first set of holes are aligned with information photocell 44 which is identical in function to the cell 44 in FIGURE 4. Its output is conducted on line 48 (having amplifier 46) and constitutes an input to the And gate 42 (lower right part of FIGURE 6), in order to gate the information extracted from the character image into logic circuits of a reading machine. In essence, this is identical to the corresponding arrangement shown in FIGURE 4. The distinctions between the embodiments of FIGURES 4 and 6 are found in the construction and nature of width detector 12*b* and height detector 16*b***.

In place of the vertical row of photocells 30 in FIGURE 4, I have one photocell 148 (for instance, a photomultiplier) whose output signals are conducted on line 160 to the amplifier 162. The group of holes 150, 151, etc., cooperating with the photocell 158 and its amplifier 162 are used to obtain both height and width information concerning the unknown characters as their images are swept across one face of scanning disc **32*b*. To facilitate understanding, assume that amplifier 162** is a quantizing amplifier to follow the hypothesis explained before in connection with the embodiment of FIGURES 4 and 5.

When a character image is first formed on the scanning disc, it is interrogated by the group of holes 150, 151, 152, etc., first, and then by the next group of holes **61*b*, 62*b*, etc. The initial procedure is to establish a scan-trace field containing the unknown character image. For this I use photocell 54 and light source 52 (same as in FIGURE 4) which is gated on and off as the holes 150, 151, etc., pass between photocell 54 and source 52. For each output signal from photocell 54, one shot multi-vibrator 166 fires to provide an output signal on a line 168** which is a square wave of a predetermined duration (FIGURE 6*b*). Thus (FIGURE 6) while the hole 150 gates on (allows light to impinge on) photocell 54, the hole 151 begins a scan-trace, whereby successive holes causing light to pulse photocell 54 establish scan traces for their previous holes as they move in alignment with photocell 158. In FIGURE 1, I have shown a few scan trace beginnings by the scan hole numbers. The one-shot multi-vibrator output 166 (FIGS. 6 and 6*a*) is of a duration which corresponds to the total height of the examination field indicated at (*d*) in FIGURE 6*a*. The duration of the one-shot multi-vibrator output is a time-function, and I am interested in a distance (length of scan traces 10 in FIGURE 1). But the rotational speed of the scanning disc is a known constance and it can be used to exactly measure a distance, i.e., the vertical dimension of the scan-field (length of the scan traces 10 of FIGURE 1). In other words, the duration of the one-shot multi-vibrator 166 is such that a scan hole will traverse a predetermined distance tuning one-shot pulse 166. By differentiating the square wave 166 with a positive 170 and negative 172 differentiator, respectively, we have available "spikes" which correspond to the beginning and end of the one-shot square wave 166, and hence the beginning and end of the scan-field traces 10. The differentiator signals are useful as references in determining the height of the character image being investigated.

The height detector function and operation will be described first, and thereafter the circuits for achieving the desired results. FIGURES 6*a* and 6*b* help to understand the operation. With distance (*d*) known, I ascertain distance (*a*), i.e., the distance between the beginning of the one-shot square wave (positive differientator "spike" 170) and the top of the character image. I also ascertain the distance between the bottom of the character image (distance *c*) and the end of the one-shot square wave 166 (negative differentiator output "spike" 172). I summarize the distances (*a*) and (*c*) and subtract them from the known distance (*d*), and this provides me with the actual height of the unknown character image. In the process, since distance (*a*) is measured, I know when to start providing sample timing signals (14 in FIGURE 2); and since distance (*c*) is known I know when to stop the sample timing signals. By subtracting ($a+c$) from (*d*), I know the exact height of the character and can adjust the oscillator frequency to provide the correct number of sample timing signals 14 (FIGURE 3) for the character.

The above measurements of distance and the use thereof is handled on an analog basis although it will later be seen that the same results could be achieved by digital techniques. To show the interchangeability of techniques I have used an analog circuit for my height detector 16*b* and a digital circuit for my width detector 12*b*.

Distance measurements (*a*), (*c*), and (*d*) are obtained by using voltages proportional to the time required for a scan hole to traverse these distances. Therefore, as an aid to understanding, let us assume that the unknown character "H" (FIGURE 6) is five units tall, and the entire vertical trace of a scan hole is eight units. To ascertain a voltage proportional to distance (*a*), I trigger a decaying saw tooth which starts at a peak of eight volts and decays linerally to 0 volts during the time of the one shot 166. A conventional saw tooth wave generator 178 (FIG. 6) will do this. Thus, the saw tooth wave decays in time with the vertical downward movement of the scan hole from "spike" 170 (FIGURE 6 ) to the top of the character (first "black"). While the saw tooth voltage is decaying, my circuits (described in detail later) await the "first black" (top of character) seen during a scan trace. At the instant of the "first black" (top of character) capacitor 180 is charged with the instantaneous voltage of the saw tooth. Subsequent "blacks" in the same scan will not effect the "first black" charge because they will be of a lower voltage. Similarly, detection of a lower "black" (part of character) in any scan will not effect the remembered charge corresponding to the highest (nearest to reference 170 in FIG. 6*a*) because they will yield lower voltage signals. Thus, capacitor 180 "remembers" the highest voltage of all of the scans for the entire character. By subtracting this voltage from the 8 volt maximum (corresponding to the entire distance between 170 and 172 of FIGURE 6*a*) I will have a numerical result of two volts corresponding to distance (*a*). The same thing is done to find distance (*c*), except the saw tooth 182 linerally rises from zero volts to eight volts during time (*d*), and I use a separate capacitor 184. For distance (*c*), the circuit (lower part of FIGURE 6*b*) is designed to record on capacitor 184 the highest voltage obtained during a scan trace, as a measure of when the scan hole in a given vertical trace last sees a part of the character image (in contrast to when a scan hole first sees the character in measuring distance *a*).

I use the technique of decaying and rising saw tooth waves to enable my height detector to function with any font, any shaped character or any kind of symbol. In explanation, see FIGURE 6*a*. During the illustrated fragment of a trace, the distance (*a*) provides a charge corresponding to only two volts on capacitor 180. But when the image moves horizontally to the right the distance *a* will be considerably greater because the horizontal part of "H" will be measured. By using a decaying saw tooth, the capacitor 180 measures the highest part of the character in the field. Another way of saying this is that capacitor 180 remembers the minimum distance (because the smaller the distance, the higher the voltage) between the top of the character and the beginning of the output of the one shot 166 (FIG. 6*b*). On the other hand, for distance (*c*) to be valid for characters such as an "H," I must remember in capacitor 184 the minimum distance between the bottom of the character and the end of the one shot output (negative differentiator signal 172). Thus, when the center of the "H" is traversed by a scan trace, the horizontal part of the character will fall somewhere between the indicated "7 volt" point (FIG. 6*b*) for the distance (*c*) and zero on the rising saw tooth and will not be recorded by the capacitor. It is now apparent that my circuit is designed to measure the extremes, i.e., the highest and lowest points of the character in the complete scan trace coverage thereof which I referred to as the "scan field." In order to numerically arrive at the 7 volt point on the saw tooth wave 182, I charge capacitor 184 continually as the scan hole traverses the image. To numerically arrive at a voltage proportional to the distance (*c*) I subtract the 7 volts from a voltage proportional to the entire distance (*d*) (8 volts in our example).

Referring now to the circuits of the height detector (FIG. 6), I gate (at 192) the output of the photocell amplifier 162 (on line 188) with the square wave of the one-shot 166 (on line 168) and with the output of the decaying saw tooth generator 178 (on line 190). Coincidence And gate 192 has an output line 194 which charges storage capacitor 180 through a diode 196. To trigger saw tooth generator 178, I use the positive differentiator 170 (connected by line 198 with the one shot output line 168). Differentiator 170 has an output line 200 operatively connected to saw tooth generator 178. Gate 192 is a "positive" And gate (responding only to positive signals), whereby the highest positive charge in a given scan trace is stored in capacitor 180. To obtain the voltage proportional to distance (*a*), a simple computation is required. A conventional subtractor 202 is connected by line 204 with capacitor 180 and compares the signal on line 204 with a reference voltage on line 206 which, in our example, will be 8 volts. Thus, the output of the subtractor 202 on line 208 will correspond to distance (*a*), i.e., 2 volts.

To obtain a voltage corresponding to distance (*c*) (FIGURE 6*a*), the output of one shot multivibrator 166 is applied a coincidence And gate 210 by way of line 168, and the rising saw tooth signal from saw tooth generator 182 is also applied to gate 210 over line of 212. Saw tooth generator 182 is triggered "on" by the output of the positive differentiator 170 via lines 200 and 214. The other input of coincidence gate 210 is from the photocell amplifier 162 over lines 188 and 189. In view of the previous explanation, it is now evident that the signal on the gate output line 218 is stored in capacitor 184 through diode 220. In the example (FIGURE 6*a* and 6*b*), the capacitor will store a charge corresponding to 7 volts (7 units measured from reference 170 vertically downward in FIGURE 6*a*). Again, a computation is required in order to obtain a signal corresponding to distance (*c*). Capacitor 184 is connected by line 22 with a subtractor 224 which subtracts the signal on line 222 from a reference voltage conducted on line 226. This reference, in the example, is 8 volts, meaning that the signal on the output line 228 of the subtractor 224 will be one volt.

By the addition of the signals on lines 208 and 228, the output on line 230 (from a conventional voltage adder 232) will be three volts corresponding to the sum of the left of FIGURE 5) sweeps horizontally across the photocells 66, the top three and the bottom two photocells will see only "white" (the character background), and all other photocells will at one time or another see "black" (part of the character mentioned). Thus, the corresponding top three and bottom two flip flops will provide no outputs on their lines 76 and all other flip flops will provide outputs on their lines which are summarized by the resistive adder 80. Thus, there will be an output signal available on line 82 of the adder, which is proportional to the height of the character. This signal is used to adjust the sample timing generator 20, for instance, by operating frequency adjusting network 18.

When the illustrated character "O" (FIGURE 5) has moved past the field of view of the photocells 66, the photocells will see the clear white space between the adjacent characters to that the signals on all lines 72 will go to −6 volts. Lines 84 are connected to lines 72, and they are gated by a negative And gate 86 which is responsive only to negative signals. When there is coincidence at gate 86, there is an output signal on line 88 representing "end of character." This signal resets all the flip flops 74, and is conducted on line 89 to analog And gate 90 which has the frequency adjusting (height measurement) signal on line 82 as its other input. Thus, the height measurement signal on line 82 is gated into the frequency adjusting network 18 when the character has just passed the vertical row of photocells 66. Had I desired to use a sample of more than one character for the height measurement, I could interpose a shift register (FIG. 6*c*) 88*a* in the flip flops reset line 88 between gate 86 and the juncture 88'. The shift register 88*a* has a number of stages "*n*" corresponding to the number of characters that I decide to count as a sample (this could be an entire line). Thus, the flip flops would not be reset, nor gate 90 actuated until the desired number of characters had been measured. Obviously, other signals to accomplish the same result may be used. In place of register 88*a*, a signal derived from the shaft of motor 34 (FIGURE 4) each time that the mirror 28 turns through a predetermined arc, could be used as an input to gate 90 and also to reset flip flops 74.

Earlier I mentioned coincidence And gate 42 (FIGURES 4 and 5). This gate passes information derived from the character when its image is projected on the information extracting disc 32 (FIGURE 4). At the time the image reaches the face of disc 32, the height detecting network will have functioned and the oscillator 20 adjusted so that gate 42 will be pulsed at the correct frequency to yield the correct number of sampling points 14 for the size of character (FIGURES 3*a* or 3, for example). The information extracted from the image is developed at photocell 44 and its amplifier 46 whose output line 48 forms the other input of gate 42.

At the lower left corner of FIGURE 5 I have shown width detector 12*a* designed to measure the width of an unknown character, which can be made to function on a character-for-character, sample-for-sample, line-for-line, etc., basis. Considering first the single-character situation, I Or gate (at 92) the signals on all lines 72 by way of interconnecting lines 94. Thus, at the time that a positive signal first occurs on any of the lines 72, the Or gate provides an output on line 96 which starts a sawtooth generator 98 whose signal is conducted on line 100 to And gate 102. As long as the gate 92 continues to conduct, the signal on lines 96, 97 is impressed on gate 102 together with the sawtooth signal. Thus, the output line 104 of gate 102 charges storage capacitor 106 through a diode 108. When the gate 92 stops conducting (the character image has passed the photocells 66 and the clear white space between the characters is detected) gate 102 stops conducting and capacitor 106 charges no higher. Now, returning to the output of the negative And gate 86 which will fire at this time (because of the clear white space between characters), its signal on line 88 is conducted over line 110 to a one-shot multi-vibrator 112 to first interrogate, and then discharge capacitor 106. Interrogation takes place at And gate 114 whose only other input is on line 116 to which capacitor 66 is connected. The output signal from gate 114 is connected to a conventional subtractor 120 which subtracts the signal derived from the charge on capacitor 106 from a reference voltage and provides the difference on line 122 which is impressed on frequency adjusting network 124, or the like, to provide the previously mentioned servo signal on line 40 to the motor 34. Very shortly after gate 114 is satisfied, the output signal from the one shot multi-vibrator 112 on line 113 is conducted through a diode 123 in delay line 125 to restore the capacitor 106 to a predetermined level. Again, if we wish to use a sample composed of more than one character for adjusting the rate at which the charcter images are horizontally swept across the reading area of disc 34, we would use a signal derived from the shaft of motor 34, as discussed before.

*Embodiments of FIGURES 6–6b*

FIGURE 6 shows scanning disc 32*b* with two sets of holes 61*b*, 62*b*, 63*b*, 64*b*, etc., and holes 150, 151, 152, etc. The first set of holes are aligned with information photocell 44 which is identical in function to the cell 44 in FIGURE 4. Its output is conducted on line 48 (having amplifier 46) and constitutes an input to the And gate 42 (lower right part of FIGURE 6), in order to gate the information extracted from the character image into logic circuits of a reading machine. In essence, this is identical to the corresponding arrangement shown in FIGURE 4. The distinctions between the embodiments of FIGURES 4 and 6 are found in the construction and nature of width detector 12*b* and height detector 16*b*.

In place of the vertical row of photocells 30 in FIGURE 4, I have one photocell 148 (for instance, a photomultiplier) whose output signals are conducted on line 160 to the amplifier 162. The group of holes 150, 151, etc., cooperating with the photocell 158 and its amplifier 162 are used to obtain both height and width information concerning the unknown characters as their images are swept across one face of scanning disc 32*b*. To facilitate understanding, assume that amplifier 162 is a quantizing amplifier to follow the hypothesis explained before in connection with the embodiment of FIGURES 4 and 5.

When a character image is first formed on the scanning disc, it is interrogated by the group of holes 150, 151, 152, etc., first, and then by the next group of holes 61*b*, 62*b*, etc. The initial procedure is to establish a scan-trace field containing the unknown character image. For this I use photocell 54 and light source 52 (same as in FIGURE 4) which is gated on and off as the holes 150, 151, etc., pass between photocell 54 and source 52. For each output signal from photocell 54, one shot multi-vibrator 166 fires to provide an output signal on a line 168 which is a square wave of a predetermined duration (FIGURE 6*b*). Thus (FIGURE 6) while the hole 150 gates on (allows light to impinge on) photocell 54, the hole 151 begins a scan-trace, whereby successive holes causing light to pulse photocell 54 establish scan traces for their previous holes as they move in alignment with photocell 158. In FIGURE 1, I have shown a few scan trace beginnings by the scan hole numbers. The one-shot multi-vibrator output 166 (FIGS. 6 and 6*a*) is of a duration which corresponds to the total height of the examination field indicated at (*d*) in FIGURE 6*a*. The duration of the one-shot multi-vibrator output is a time-function, and I am interested in a distance (length of scan traces 10 in FIGURE 1). But the rotational speed of the scanning disc is a known constance and it can be used to exactly measure a distance, i.e., the vertical dimension of the scan-field (length of the scan traces 10 of FIGURE 1). In other words, the duration of the one-shot multi-vibrator 166 is such that a scan hole will traverse a predetermined distance tuning one-shot pulse 166. By differentiating the square wave 166 with a positive 170 and negative 172 differentiator, respectively, we have available "spikes" which correspond to the beginning and end of the one-shot square wave 166, and hence the beginning and end of the scan-field traces 10. The differentiator signals are useful as references in determining the height of the character image being investigated.

The height detector function and operation will be described first, and thereafter the circuits for achieving the desired results. FIGURES 6*a* and 6*b* help to understand the operation. With distance (*d*) known, I ascertain distance (*a*), i.e., the distance between the beginning of the one-shot square wave (positive differentiator "spike" 170) and the top of the character image. I also ascertain the distance between the bottom of the character image (distance *c*) and the end of the one-shot square wave 166 (negative differentiator output "spike" 172). I summarize the distances (*a*) and (*c*) and subtract them from the known distance (*d*), and this provides me with the actual height of the unknown character image. In the process, since distance (*a*) is measured, I know when to start providing sample timing signals (14 in FIGURE 2); and since distance (*c*) is known I know when to stop the sample timing signals. By subtracting (*a*+*c*) from (*d*), I know the exact height of the character and can adjust the oscillator frequency to provide the correct number of sample timing signals 14 (FIGURE 3) for the character.

The above measurements of distance and the use thereof is handled on an analog basis although it will later be seen that the same results could be achieved by digital techniques. To show the interchangeability of techniques I have used an analog circuit for my height detector 16*b* and a digital circuit for my width detector 12*b*.

Distance measurements (*a*), (*c*), and (*d*) are obtained by using voltages proportional to the time required for a scan hole to traverse these distances. Therefore, as an aid to understanding, let us assume that the unknown character "H" (FIGURE 6) is five units tall, and the entire vertical trace of a scan hole is eight units. To ascertain a voltage proportional to distance (*a*), I trigger a decaying saw tooth which starts at a peak of eight volts and decays linerally to 0 volts during the time of the one shot 166. A conventional saw tooth wave generator 178 (FIG. 6) will do this. Thus, the saw tooth wave decays in time with the vertical downward movement of the scan hole from "spike" 170 (FIGURE 6 ) to the top of the character (first "black"). While the saw tooth voltage is decaying, my circuits (described in detail later) await the "first black" (top of character) seen during a scan trace. At the instant of the "first black" (top of character) capacitor 180 is charged with the instantaneous voltage of the saw tooth. Subsequent "blacks" in the same scan will not effect the "first black" charge because they will be of a lower voltage. Similarly, detection of a lower "black" (part of character) in any scan will not effect the remembered charge corresponding to the highest (nearest to reference 170 in FIG. 6*a*) because they will yield lower voltage signals. Thus, capacitor 180 "remembers" the highest voltage of all of the scans for the entire character. By subtracting this voltage from the 8 volt maximum (corresponding to the entire distance between 170 and 172 of FIGURE 6*a*) I will have a numerical result of two volts corresponding to distance (*a*). The same thing is done to find distance (*c*), except the saw tooth 182 linerally rises from zero volts to eight volts during time (*d*), and I use a separate capacitor 184. For distance (*c*), the circuit (lower part of FIGURE 6*b*) is designed to record on capacitor 184 the highest voltage obtained during a scan trace, as a measure of when the scan hole in a given vertical trace last sees a part of the character image (in contrast to when a scan hole first sees the character in measuring distance *a*).

I use the technique of decaying and rising saw tooth waves to enable my height detector to function with any font, any shaped character or any kind of symbol. In explanation, see FIGURE 6*a*. During the illustrated fragment of a trace, the distance (*a*) provides a charge corresponding to only two volts on capacitor 180. But when the image moves horizontally to the right the distance *a* will be considerably greater because the horizontal part of "H" will be measured. By using a decaying saw tooth, the capacitor 180 measures the highest part of the character in the field. Another way of saying this is that capacitor 180 remembers the minimum distance (because the smaller the distance, the higher the voltage) between the top of the character and the beginning of the output of the one shot 166 (FIG. 6*b*). On the other hand, for distance (*c*) to be valid for characters such as an "H," I must remember in capacitor 184 the minimum distance between the bottom of the character and the end of the one shot output (negative differentiator signal 172). Thus, when the center of the "H" is traversed by a scan trace, the horizontal part of the character will fall somewhere between the indicated "7 volt" point (FIG. 6*b*) for the distance (*c*) and zero on the rising saw tooth and will not be recorded by the capacitor. It is now apparent that my circuit is designed to measure the extremes, i.e., the highest and lowest points of the character in the complete scan trace coverage thereof which I referred to as the "scan field." In order to numerically arrive at the 7 volt point on the saw tooth wave 182, I charge capacitor 184 continually as the scan hole traverses the image. To numerically arrive at a voltage proportional to the distance (*c*) I subtract the 7 volts from a voltage proportional to the entire distance (*d*) (8 volts in our example).

Referring now to the circuits of the height detector (FIG. 6), I gate (at 192) the output of the photocell amplifier 162 (on line 188) with the square wave of the one-shot 166 (on line 168) and with the output of the decaying saw tooth generator 178 (on line 190). Coincidence And gate 192 has an output line 194 which charges storage capacitor 180 through a diode 196. To trigger saw tooth generator 178, I use the positive differentiator 170 (connected by line 198 with the one shot output line 168). Differentiator 170 has an output line 200 operatively connected to saw tooth generator 178. Gate 192 is a "positive" And gate (responding only to positive signals), whereby the highest positive charge in a given scan trace is stored in capacitor 180. To obtain the voltage proportional to distance (*a*), a simple computation is required. A conventional subtractor 202 is connected by line 204 with capacitor 180 and compares the signal on line 204 with a reference voltage on line 206 which, in our example, will be 8 volts. Thus, the output of the subtractor 202 on line 208 will correspond to distance (*a*), i.e., 2 volts.

To obtain a voltage corresponding to distance (*c*) (FIGURE 6*a*), the output of one shot multivibrator 166 is applied a coincidence And gate 210 by way of line 168, and the rising saw tooth signal from saw tooth generator 182 is also applied to gate 210 over line of 212. Saw tooth generator 182 is triggered "on" by the output of the positive differentiator 170 via lines 200 and 214. The other input of coincidence gate 210 is from the photocell amplifier 162 over lines 188 and 189. In view of the previous explanation, it is now evident that the signal on the gate output line 218 is stored in capacitor 184 through diode 220. In the example (FIGURE 6*a* and 6*b*), the capacitor will store a charge corresponding to 7 volts (7 units measured from reference 170 vertically downward in FIGURE 6*a*). Again, a computation is required in order to obtain a signal corresponding to distance (*c*). Capacitor 184 is connected by line 22 with a subtractor 224 which subtracts the signal on line 222 from a reference voltage conducted on line 226. This reference, in the example, is 8 volts, meaning that the signal on the output line 228 of the subtractor 224 will be one volt.

By the addition of the signals on lines 208 and 228, the output on line 230 (from a conventional voltage adder 232) will be three volts corresponding to the sum of the distance (*a*) and the distance (*c*). It is now simple to subtract, by means of subtractor 234, the three volt signal on line 230 from an 8 volt reference on line 236 to provide a signal on the subtractor output line 238 which corresponds to the true height of the character.

This true height signal can be used exactly as described in connection with FIGURES 4 and 5, i.e., to operate a frequency adjuster 18*b* which adjusts the frequency of the sample pulse generator or oscillator 20*b*. Its output on line 240 is gated at 42 with information conducted on line 48 from the information photocell 44. The only problem to be resolved is to make certain that the sample pulse timing generator 20*b* is adjusted and rendered operative when the character has been completely examined (FIGURE 6*a*) by the holes 150, 151, 152, etc., and has reached the information extracting scan holes 61*b*, 62*b*, etc., and the photocell 44 with which they are operable. This is assured by waiting for an "all white scan" signal from one or more of the scan holes 150, 151, 152, etc., before applying the "true height" signal on line 238 to the frequency adjuster 18*b*. A part of the circuit for doing this is used with the width detector 12*b*, but as pertaining to the height detector 16*b*, I have a flip flop 250 which is set by signal on line 252 connected with the photocell amplifier 162 output line (188) and which is reset at the end of each scan trace of the previously mentioned examination field (FIGURE 1). Flip flop 250 responds only to "black" signals, i.e., +6 volts in our example. Consequently, during the time of one scan trace, e.g., the trace of hole 153 shown in FIGURE 1, if a portion of the character image is detected, there will be a positive signal on line 188 which sets flip flop 250 via line 252. The output of the flip flop is conducted on lines 254 and 256 to the inhibit terminal of an inhibit gate 258. The only other input of gate 258 is from the negative differentiator 172 (end of scan trace) by way of lines 260, 261. At the end of the trace (represented by the output of the negative differentiator 172 on line 260) the gate 258 will not conduct a signal on its output line 262 if the flip flop 250 has been set during the scan trace. The flip flop 250 is reset through a brief delay at 264, from the signal on line 260. Thus, we now have a situation where there will be no signal on line 262 as long as a scan hole 150, 151, 152, etc., detects a part of the character during the scan trace that it generates. But, if an entire scan trace yields no black signal on lines 188, 252, the flip flop will not be set during that scan trace, and the output of the negative differentiator 172 (end of scan trace) will then be conducted on lines 260, 261, to the non-inhibited gate 258 and provide a signal on lines 262, 270, which signifies an "all white scan." This forms one input of And gate 272, and the other is the "true height" signal on line 238 for actuating the frequency adjusting network 18*b*. If more than one "all white scan" is desired before providing a signal on lines 262, 270, the only requirement is to interpose a shift register, counter or the like, in line 256 (same as FIGURE 6*c*). Furthermore, if a sample of more than one character or an entire line is desired before adjusting the frequency adjusting network 18*b*, the signal on line 270 can be obtained in another way, e.g., at the end of the mirror sweep (as described in connection with FIGURE 4), a portion thereof, or by interposing a counter of more than one stage in line 260 ahead of the juncture of lines 260 and 261.

After adjusting the frequency of the sample pulse generator 20*b* to obtain sampling points to suit the height of the character, as illustrated in FIGURES 3 and 3*a*, the capacitors 180 and 184 are discharged. A simple way to illustrate this is by a delay line 280 connected to the "all white scan" signal line 270, having diodes 282 and 284 connected to discharge the capacitors 180 and 184. If the capacitors 180 and 184 are charged positive as in the illustrations, a comparatively heavy negative charge is conducted on line 280, for example, by interposing a one-shot multi-vibrator 290 in the delay line 280.

The width detector 12*b* is used to determine the required horizontal spacing between vertical traces (FIGURES 1 and 1*a*) to have the same number of vertical scan lines for every character even though the characters vary in width. Methods of accomplishing this are increasing or decreasing the speed of the document drive, changing the sweep rate of the mirror 28 (FIGURE 4 and FIGURE 6), changing the oscillation rate of an oscillatory mirror to take the place of mirror 28, etc. By assuming a constant rotational speed of disc 32*b*, a change in the speed of the mirror drive motor 34*b* (FIGURE 4) will produce a corresponding change in the number of vertical traverses of holes 61*b*, 62*b*, etc., of the image of an unknown character. As I described before, flip flop 250 is set (provides an output on line 254) each time that the photocell 158 detects a "black" (portion of a character) during the examination field times (duration of each one-shot 166 actuation). Thus, I can count the number of vertical traces, containing a "black" signal by a filling shift register 300 or the equivalent, connected to the flip flop output line 254, via line 302. Since the diagrammatic drawings (FIGURES 1–3) show six vertical traverses as the desired number (although I have already explained that this number is usually preferably increased for higher resolution), the digital circuit for width detector 12*b* is designed for six vertical traces. All that is required is to remember the number of vertical traces containing character information between "all white signals" on lines 270, 304 by stepping the filling shift register 300 one stage for each of these traces. When I receive an "all-white scan" signal on lines 262, 304 it is used to trigger a pulse burst generator 306 which shifts out or unloads the shift register 300. The output signal on line 308 from the filling shift register is a pulse train where each pulse will represent a vertical trace containing a "black" signal. In case that the photocell 158 sees two or more black signals for each vertical trace (e.g., when a capital "E" is vertically scanned) I will still have a count of "one" for each vertical trace because the flip flop 250 is set and re-set only once per vertical trace, this being the inherent operation of a conventional flip flop.

The signal on line 308 is then handled by conventional digital circuits which are well know in this art. Since I desire six vertical traces for each character, I compare the signal on line 308 by a digital comparator 310 to the desired six pulses and conduct the result on the line 312 to a digital sum or difference circuit 314 whose output on line 40*b* is the correct servo signal. It is impressed on electric motor 34*b* to either accelerate or decelerate the motor. Thus, the speed of the motor is adjusted as required to have the character image traversed by six, and only six of the scan holes 61*b*, 62*b*, 63*b*, etc.

It is understood that the illustrated forms of my invention are given by way of example only and that numerous changes, modifications, etc., may be made without departing from the protection of the following claims.

I claim:

1. A scanning system for scanning different size characters with the same number of samples, said system comprising scanning means to provide information outputs corresponding to the characters, adjustable means to provide sample timing signals, means for gating said sample-timing signals with said information outputs, means responsive to the heights of the characters for adjusting the rate of said timing signals-providing means to provide said same number of samples for characters of different sizes, said scanning means examining the characters by a plurality of adjacent lines, and said timing signals determining the number of information samples in each line, and means responsive to the widths of the characters to control the rates at which said lines are provided on the characters in a manner such that characters of different widths are examined by the same number of lines.

2. In a normalizing scan pattern system for different size characters on a background, the improvement comprising an optical device to examine characters and their background areas line-by-line where the length of each line is greater than the dimensions of the unknown characters in the direction of said lines, triggered means to measure the heights of the unknown characters and provide a height size-indicating signal, means to trigger said measuring means at the same place along each of said lines, said optical device including photosensitive means to provide outputs which correspond to the optical density of the unknown characters and their background areas along said lines, a sample-timing signal generator, means to gate said timing signals with said photosensitive means outputs to provide an information signal having information modulations corresponding to the optical densities of said subareas along said lines, and means responsive to said height size indicating signal for adjusting the frequency of said sample-timing signal means, and for thereby providing a predetermined same number of samples during each of said lines regardless of the height of the unknown characters so long as the dimensions thereof along said lines are smaller than the length of said lines, a width detector for the unknown characters, and means responsive to the width detector to assure that the characters are examined with the same number of lines notwithstanding character-width variations.

3. A normalizing scan pattern system to scan characters of different sizes with the same number of scan lines, said system comprising a scanner to examine an unknown character by successive lines, said scanner including means to provide outputs which correspond to the optical densities of the characters along each scan line, a sample-timing signal generator, means to gate the sample timing signals with said outputs for successive lines to provide information modulated signals, a size detector for measuring the size of the unknown character in a direction parallel to said lines and to provide a signal corresponding to the maximum height of the character, and means responsive to said height signal for adjusting the frequency of said signal generator to correspond thereto so that the number of samples per line is the same for all characters and the frequency is compressed or expanded to cover the full height of the character.

4. A scanning system for characters of different heights, said system comprising scan means providing vertical scans of each character, a height detector for the characters to provide a signal indicating the height of each character, adjustable means operative with said scan means to provide sample timing signals during each scan, and means responsive to said height signal for adjusting said sample-timing-signal-providing means to the frequency required to have a predetermined number of sample signals during each vertical scan regardless of the height of the character.

5. In a normalizing scan pattern system for unknown characters, a scanning disc having a plurality of scan holes, photosensitive means operable with said scanning disc to extract information from an unknown character whose image is projected onto the face of said disc, gated means to establish a scan field, said scan field establishing means being gated by one of said scan holes, pre-examination means to measure a dimension of the unknown character and provide a corresponding signal, and means responsive to said signal for normalizing the area of examination of said unknown character to the size of the character.

6. The subject matter of claim 5 and means to detect another dimension of the unknown character and provide a second signal corresponding thereto, and means responsive to said second signal for further normalizing the area of examination of the unknown character.

7. In a scan system for characters where an unknown character is examined along adjacent lines and at discrete points of each line, the improvement comprising means to measure the height of an unknown character and provide a height signal corresponding to the actual height of the image of the character, means to provide sample timing signals, means responsive to said height signal for adjusting said sample-timing-signals-providing means to correspond thereto, means to measure the width of the unknown character and provide a width signal, and means responsive to said width signal for providing a pre-determined number of said lines to correspond to the width of the unknown character so that each unknown character is examined with the same number of lines and with the same number of samples in each line.

References Cited by the Examiner

UNITED STATES PATENTS

| | | | |
|---|---|---|---|
| 2,838,602 | 6/58 | Sprick | 340—146.3 |
| 3,039,080 | 6/62 | King | 340—146.3 |
| 3,050,711 | 8/62 | Harmon | 340—146.3 |
| 3,065,457 | 11/62 | Bailey | 340—146.3 |

FOREIGN PATENTS 850,581 10/60 Great Britain.

OTHER REFERENCES

Pages 173–175, 4/57, "Reading by Electronics," published in Wireless World.

MALCOLM A. MORRISON, *Primary Examiner.*